United States Patent [19]
Burki

[11] 3,879,930
[45] Apr. 29, 1975

[54] CLOCKWORK MOVEMENT COMPRISING A GEAR-TRAIN WITH A FRICTION CLUTCH THEREIN

[75] Inventor: Hugues Burki, L'Orient, Switzerland

[73] Assignee: Societe Suisse pour l'Industrie Horlogere Management Services SA, Bienne, Switzerland

[22] Filed: July 5, 1974

[21] Appl. No.: 486,105

[30] Foreign Application Priority Data
July 10, 1973  Switzerland...................... 10033/73

[52] U.S. Cl................................. 58/7; 58/DIG. 1
[51] Int. Cl. ............................................ G04b 13/00
[58] Field of Search .................................. 58/7–22.9

[56] References Cited
UNITED STATES PATENTS
| | | | |
|---|---|---|---|
| 2,709,886 | 6/1955 | Heim | 58/8 |
| 2,779,150 | 1/1957 | Chartier et al. | 58/16 |
| 3,270,493 | 9/1966 | Wallace | 58/18 X |

*Primary Examiner*—Lawrence R. Franklin
*Attorney, Agent, or Firm*—Stevens, Davis, Miller & Mosher

[57] ABSTRACT

This invention relates to a clockwork movement comprising a gear-train, and in this gear-train, a friction clutch comprising a driven part rotating about an axis and provided with an axially movable coupling element having a toothing, and a driving part coaxial with the driven part and provided with an axially immovable coupling element.

12 Claims, 3 Drawing Figures

CLOCKWORK MOVEMENT COMPRISING A GEAR-TRAIN WITH A FRICTION CLUTCH THEREIN

Chronograph movements are already known in which the chronograph-hand is driven from a toothed wheel belonging to the driven part of a friction clutch of which the driving part, coaxial with the driven part, is inserted in the gear-train connecting the barrel to the escapement. In certain known chronograph movements of this type, the driving part of the friction clutch constitutes the fourth wheel-and-pinion of the gear-train. Its pinion is driven by the third wheel; and its wheel, of the same diameter as that of the driven part, drives a wheel having a seconds hand secured thereto. The chronograph-hand is therefore started and stopped by axial displacement of a coupling element by means of a control member actuated from outside the movement.

In certain cases, the toothing integral with the driven part of the clutch is liable to disengage from the toothing of the chronograph-hand wheel when the uncoupling takes place, and this may cause damage upon restarting. Moreover, these known chronograph movements have the drawback that upon uncoupling, the axially movable coupling element may undergo a slight inopportune rotation at the moment when the control member comes into contact with it, so that the chronograph-hand may make a jump which falsifies the desired measurement.

Furthermore, these known clutch devices have only a single toothing in their driven part, so that they cannot serve to drive the chronograph-hand and a minute-counter, for example, simultaneously.

It is the object of this invention to provide improvements over the known clockwork movements of this type, particularly so as to enable instantaneous stopping of the chronograph-hand at the moment of uncoupling, to prevent any inopportune jump of that hand, and to make it possible to control not only the chronograph-hand, but also the minute-counter, by means of the same clutch, without incrasing the size of the clutch arrangement as compared with those of the prior art.

To this end, in the clockwork movement according to the present invention, the driven part comprises at least one further toothing which is axially immovable, and the clutch further comprises a rigid control member cooperating with the axially movable coupling element and two members for guiding the control member and for causing it to effect movements of pure translation in a direction parallel to that of the axis of the clutch upon actuation thereof.

A preferred embodiment of the invention will now be described in detail with reference to the accompanying drawings, in which.

Figure 1:
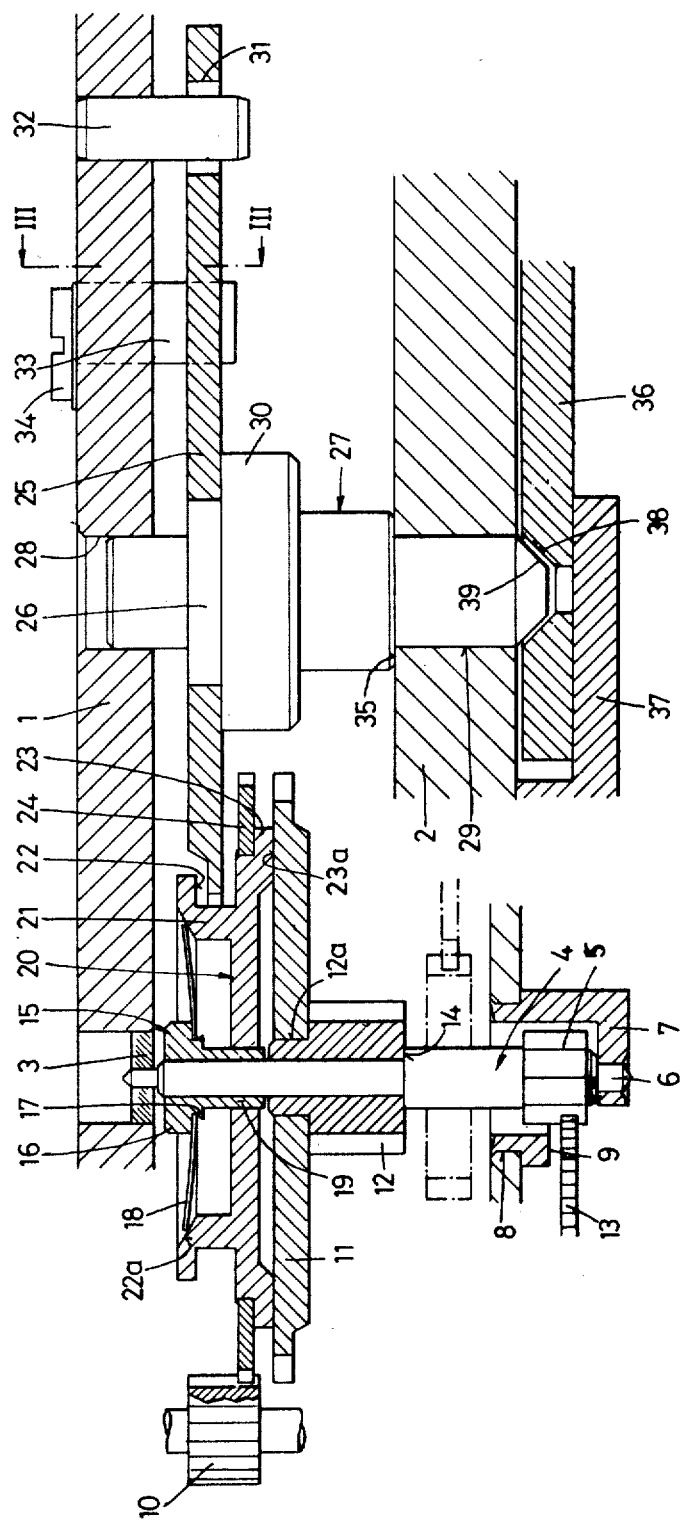
FIG. 1 is a general sectional view.

The clockwork movement illustrated in the drawing comprises two rigid frame elements 1 and 2, between which various elements of a gear-train are mounted. Thus the frame element 1 comprises an opening into which is driven a jewel 3 serving as an upper bearing for an arbor 4 having a pinion-toothing 5 near its lower end, then below this toothing 5 a pivot 6 engaged in a bearing hole in the bottom of a socket 7 which is clinched in an opening 8 in the frame element 2. The socket 7 has an undercut 9 in its bottom and sidewall so that a wheel 13 may mesh with the toothing 5. Another pinion 10, which is the chronograph-hand pinion, also pivots, in a manner not shown in the drawing, between the frame elements 1 and 2.

The arbor 4 constitutes an element of the driven part of a friction clutch. The driving part of this clutch consists of a toothed disc 11 and a pinion 12. The pinion 12 is mounted loose on a small-diameter cylindrical bearing surface of the arbor 4 and rests against a shoulder 14 of the arbor 4. For part of its length, the pinion 12 takes the form of a cylindrical bearing surface 12a which is engaged in a central opening in the disc 11, so that these two elements are integral with one another. The driving part 11, 12 constitutes the third wheel-and-pinion of the movement illustrated in the drawing. It is held in place axially by a profile-turned sleeve 15 which is driven onto the end of the small-diameter bearing surface of the arbor 4. Thus as may be seen in the drawing, the driving part has two toothings of different diameters. One of them will be engaged with a driving wheel-and-pinion (not shown), while the other may serve to drive other wheels and pinions of gear-trains forming part of the mechanism described, these other wheels and pinions thus being continuously driven. It will be noted that the upper face of the disc 11 is plane. The disc 11 actually constitutes a clutch-plate, the axial displacement of which is limited to the clearance necessary for rotation of the wheel and pinion. The sleeve 15, driven onto the arbor 4, has at its upper end a collar 16 which is adjacent to a bearing surface 17 serving to clinch against the collar 16 a thin resilient element 18, e.g., a star-shaped blade-spring, with possible interposition of a friction disc. Beyond the bearing surface 17, the sleeve 15 has a cylindrical bearing surface 19 which serves as a guide surface for a movable clutchplate 20. This latter part, which is generally disc-shaped, is therefore fitted on the bearing surface 19 so as to rotate freely thereon and to be axially guided. A peripheral rib 21 which projects from its upper face is bevelled at its inner edge, as may be seen at 22a, so as to constitute a support for the periphery of the resilient element 18. Moreover, in the annular outer face of the rib 21, there is a rectangular-profile groove 22, while the periphery of the lower face of the disc 20 also has an annular rim 23, with an annular plane surface 23a facing the disc 11. A toothed ring 24 is driven or clinched onto the rim 23. The toothing of the ring 24 is engaged with the teeth of the pinion 10, the axial height of these teeth being greater than the thickness of the ring 24, however.

Normally, the clutch-plate 20 is kept held against the plate 11 by the resilient element 18, the lower face of the rim 23 being pressed against the upper face of the plate 11. Hence when the driving part of the clutch is rotated, the plate 20 is driven by friction, while the sleeve 15 and, consequently, the arbor 4 are likewise driven by friction. The toothing 24 drives the pinion 10, and the pinion 5 drives the wheel 13 which meshes with it.

It will also be realized that if the plate 20 is moved axially upwards against the action of the spring 18, by means of a control plate 25, it ceases to be driven rotatingly and blocks the arbor 4, for the shoulder of the groove 22 is held against the plate 25 by the spring 18, the tension of which has increased by reason of the aforesaid movement. In order that the pinion and the wheel meshing with the toothings 24 and 5, respectively, may be stopped or started without jerking, jumping, or pausing, it is indispensable for the clutch-plate 20 to be displaced without effecting any inopportune rotation. Such a displacement is obtained by means of a movement parallel to the axis of the wheel-and-pinion bearing the clutch, this movement being carried out by means of the control mechanism which will now be described.

Figure 2:
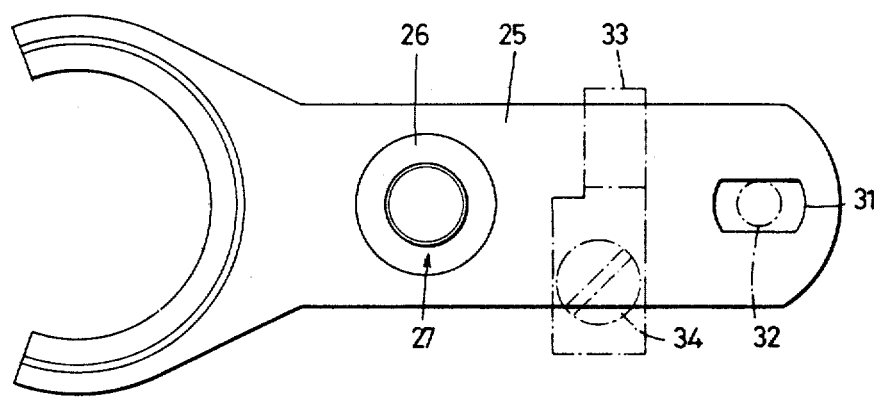
FIG. 2 is a top plan view of the control plate.
Figure 3:
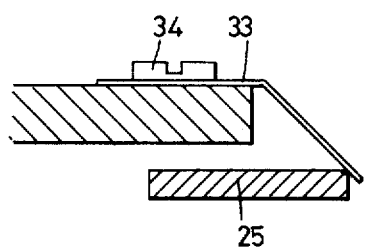
FIG. 3 is a partial section taken on the line III—III of FIG. 1.

The control mechanism comprises first of all the control plate 25, the plan shape of which is shown in FIG. 2. At its left-hand end, as viewed in that figure, the plate 25 has a thinned arcuate portion which is engaged in the groove 22 and which, if the plate 25 is moved upwardly, comes to rest against the upper flank of the groove 22 and moves the plate 20. The plate 25 also has a circular opening into which is driven a cylindrical bearing surface 26 of a guide stem 27, the upper end of which is engaged in an opening 28 in the frame element 1, and the lower end of which passes through an opening 29 in the frame element 2. A collar 30, the upper flank of which forms a sholder perpindicular to the axis of the stem 27, ensures the positioning of the plate 25 with respect to the stem 27. A second, elongated opening 31 at the end of the plate 25 serves to engage a pin 32 driven into a hole in the frame element 1. The stem 27 and the pin 32 are intended to guide the movement of the plate 25 in a direction parallel to the arbor 4 and, at the same time, to prevent any rotating movement of the plate 25. In order to avoid the necessity of adjusting the stem 27 and the pin 32 very closely in their respective openings, while avoiding any lateral play at the same time, the frame element 1 also bears a resilient blade-spring 33 fastened by a screw 34 along an edge of the frame element 1. The free end of the blade-spring 33 extends downwards at a slant so as to press on one of the longitudinal edges of the plate 25, exerting an obliquely-directed force upon it. The component of this force which is parallel to the frame element 1 presses the ends of the stem 27 against the sidewalls of the openings 28 and 29 and presses the opening 31 against the side surface of the pin 32. Thus the position of the plate 25 is exactly determined, so that when it moves axially, it cannot undergo any rotating motion harmful to the driven wheels and pinions. Moreover, the vertical component of the force exerted by the spring 33 constantly tends to move the control plate 25 downwards, i.e., to return it to the coupling position in which a shoulder 35 of the stem 27 rests against the upper face of the frame element 2, and consequently leaves the plate 20 completely free.

The plate 25 is actuated by means of a slide 36 consisting of a simple plate held with a certain degree of play against the lower face of the frame element 2 by a fastening plate 37. In the slide 36 is a frustoconical opening 38 which cooperates with the lower end of the stem 27, the latter also having a frustoconical end portion 39 with flanks inclined at the same angle. If the slide 36 is moved towards the right, starting from the position shown in FIG. 1, the frustoconical flanks of the opening 38 act upon the frustoconical bearing surface 39 and move the stem 27 and the plate 25 to bring them into the uncoupling position. The slide 36 may be connected to a control push-piece of a type known per se so as to be moved alternately from right to left and from left to right to effect the engagement and disengagement of the clutch. Instead of being sliding, the part 36 might also consist of a pivoting lever. It could also take the form of a rotating cam having a series of openings like opening 38 distributed about its axis, this cam being equipped, for example, with a ratchet toothing adapted to be controlled by a push-piece. Instead of the openings 38, this cam might also have catches with inclined slopes adapted to lift and lower the stem 27 under the effect of the spring 33.

The arrangement described above therefore makes it possible, through the displacement of a single member consisting of the plate 20, accurately to set in motion and to block several toothings of different diameters, these toothings being adapted to drive several gear-trains.

It will be realized that such a clutch arrangement can be utilized in many different ways in timepieces, particularly in chronographs and timers. In the embodiment described, because the displacement of the plate 20 is strictly parallel to the arbor bearing the clutch and is without any rotation, the toothing of the ring 24 moves along the teeth of the pinion 10 without any risk of jamming and without any angular movement of that pinion.

It will be obvious that in another embodiment, the driven part of the arrangement described might also comprise a larger number of toothings. Thus, for example, there could be disposed between the pinions 12 and 5 a wheel and pinion with a wheel-toothing and/or a pinion-toothing which would be integral with the arbor 4 and would make it possible to drive a wheel and/or a pinion at any desired speed ratio.

What is claimed is:

1. A clockwork movement comprising a gear train, and in said gear-train, a friction clutch comprising a driven part rotating about an axis and provided with an axially movable coupling element having a toothing, and a driving part coaxial with the driven part and provided with an axially immovable coupling element, wherein the said driven part comprises at least one further toothing which is axially immovable, and said clutch further comprises a rigid control member cooperating with the said axially movable coupling element and two members for guiding said control member and for causing it to effect movements of pure translation in a direction parallel to that of the axis of the clutch upon actuation of said clutch.

2. A clockwork movement in accordance with claim 1, wherein said axially immovable coupling element is a toothed wheel having a plane surface facing said movable coupling element, said axially movable coupling element is a movable plate having an annular plane surface facing said immovable element, and said movable plate is acted upon by a spring.

3. A clockwork movement in accordance with claim 2, wherein said clutch comprises an arbor mounted between two bearings, said spring is integral with said arbor, and said movable plate is mounted axially slidingly with respect to said arbor.

4. A clockwork movement in accordance with claim 3, wherein said movable plate is freely fitted on said arbor and is made integral in rotation with said arbor by said spring.

5. A clockwork movement in accordance with claim 2, wherein the axially immovable coupling element is integral with a pinion mounted loose on said arbor.

6. A clockwork movement in accordance with claim 5, the axially movable plate and the arbor constituting the driven part of the clutch, wherein said arbor has at least one additional toothing.

7. A clockwork movement in accordance with claim 1, wherein said axially movable coupling element has a peripheral groove in which said control member is engaged.

8. A clockwork movement in accordance with claim 1, wherein said control member is integral with one of said guide members, and said one of the guide members consists of a stem, the two ends of which are respectively engaged in coaxial openings in frame elements of the movement.

9. A clockwork movement in accordance with claim 8, wherein the other of said guide members consists of a pin integral with one of said frame elements, parallel to said one of the guide members, and engaged in an opening in said control member.

10. A clockwork movement in accordance with claim 9, further comprising a resilient element mounted on one of said frame elements and continuously acting upon said control member in such a way that said guide members are pressed against the sides of said openings in which they are engaged.

11. A clockwork movement in accordance with claim 10, wherein said resilient element is a flat blade disposed at a slant so as to exert upon said control member a force having a component parallel to the axis of said clutch and tending to hold said control member in a position where said movable coupling element is axially pressed against said immovable coupling element.

12. A clockwork movement in accordance with claim 10, wherein one of the ends of said stem cooperates with an engaging and disengaging member adapted to move in such a way as to actuate said control member axially against the action of said resilient element.

* * * * *